US010185133B1

(12) United States Patent
Cook

(10) Patent No.: US 10,185,133 B1
(45) Date of Patent: Jan. 22, 2019

(54) REFLECTIVE TRIPLET FOREOPTICS FOR MULTI-CHANNEL DOUBLE-PASS DISPERSIVE SPECTROMETERS

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/705,837

(22) Filed: Sep. 15, 2017

(51) Int. Cl.
G02B 17/06 (2006.01)
G02B 5/10 (2006.01)
G01J 3/02 (2006.01)
G01J 3/26 (2006.01)

(52) U.S. Cl.
CPC .......... *G02B 17/0631* (2013.01); *G01J 3/024* (2013.01); *G01J 3/0208* (2013.01); *G01J 3/26* (2013.01); *G02B 5/10* (2013.01); *G02B 17/0663* (2013.01); *G01J 2003/262* (2013.01)

(58) Field of Classification Search
CPC .. G02B 17/0631; G02B 17/0663; G02B 5/10; G01J 3/0208; G01J 3/024; G01J 3/26; G01J 2003/262
USPC ........................................................ 356/326
See application file for complete search history.

(56) References Cited

U.S. PATENT DOCUMENTS

| 3,460,886 A | 8/1969 | Lower et al. |
| 4,240,707 A | 12/1980 | Wetherell et al. |
| 4,733,955 A | 3/1988 | Cook |
| 4,804,258 A | 2/1989 | Kebo |
| 5,260,767 A | 11/1993 | Cook |
| 5,309,276 A | 5/1994 | Rodgers |
| 5,880,834 A | 3/1999 | Chrisp |
| 6,016,220 A * | 1/2000 | Cook ................. G02B 17/0642 359/351 |
| 6,100,974 A | 8/2000 | Reininger |

(Continued)

FOREIGN PATENT DOCUMENTS

EP    1072922 A1    1/2001

OTHER PUBLICATIONS

Invitation to Pay Additional Fees and, Where Applicable, Protest Fee in application No. PCT/US2018/041252 dated Sep. 26, 2018.

(Continued)

*Primary Examiner* — Hina F Ayub
(74) *Attorney, Agent, or Firm* — Lando & Anastasi, LLP

(57) ABSTRACT

A non-relayed reflective triplet and a double-pass imaging spectrometer including the reflective triplet configured as its objective. In one example the reflective triplet includes a primary mirror that receives and reflects electromagnetic radiation from a viewed scene and defines an optical axis of the optical system, a secondary mirror that receives and reflects the electromagnetic radiation reflected from the primary mirror, and a tertiary mirror that receives the electromagnetic radiation reflected from the secondary mirror and focuses the electromagnetic radiation onto an image plane to form an image of the viewed scene. The primary, secondary, and tertiary mirrors together are configured to form a virtual exit pupil for the optical system, the image plane being located between the tertiary mirror and the virtual exit pupil. The reflective triplet is on-axis in aperture and off-axis in field of view.

20 Claims, 5 Drawing Sheets

(56) References Cited

U.S. PATENT DOCUMENTS

| | | |
|---|---|---|
| 7,382,498 B1 | 6/2008 | Cook |
| 8,248,693 B2 | 8/2012 | Cook |
| 8,416,407 B2 | 4/2013 | Cook |
| 9,354,116 B1 | 5/2016 | Cook |
| 2004/0021934 A1* | 2/2004 | Cook .................. G01J 3/02 359/366 |
| 2011/0085235 A1* | 4/2011 | Cook ............. G02B 17/0652 359/366 |

OTHER PUBLICATIONS

Bottema, M. "Reflective Correctors for the Hubble Space Telescope Axial Instruments", Applied Optics, Optical Society of America, Washington, DC. (Apr. 1993) vol. 32, No. 10, pp. 1768-1774.

Crocker, J. H. "Fixing the Hubble Space Telescope", Proceedings of SPIE (Sep. 1991) vol. 1494, p. 2-8.

* cited by examiner

| Surface | Element | Rd | CC | Ad | Ae | Af | Ag | Decenter | Tilt | Thickness | Material |
|---|---|---|---|---|---|---|---|---|---|---|---|
| 1 | Primary Mirror (110) | -124.000 | -0.98616 | | | | | | | -48.3807 | Refl |
| 2 | Secondary Mirror (120) | -29.6874 | -1.31983 | -1.572E-07 | -7.840E-10 | 3.920E-11 | -5.127E-13 | 0.068163 | 0.10797 | 102.656 | Refl |
| 3 | Tertiary Mirror (130) | -39.4112 | -0.41844 | -1.744e-07 | 2.98e-09 | -1.267e-11 | 2.049E-14 | -6.14927 | -2.5658 | -15.0645 | Refl |
| 4 | Image (150) | inf | | | | | | -1.4905 | | -8.7236 | Air |
| 5 | Exit Pupil (170) | inf | | | | | | -3.8254 | 23.6374 | 8.7236 | Air |
| 6 | Image (150) | inf | | | | | | -1.4905 | | | Air |

Linear units are centimeters (cm); angular units are degrees (deg.)
Entrance pupil at primary mirror; diameter is 62 cm
Sagittal field-of-view (FOV) is 1.0 deg; tangential FOV is small
FOV offset is 0.562 deg.
System speed is F/3.00
Sagittal slit width is 3.246 cm
Optical path length from image to exit pupil is 9.519 cm
Tilts and decenters are reversed to return to optical axis before thickness

FIG.3

REFLECTIVE TRIPLET FOREOPTICS FOR MULTI-CHANNEL DOUBLE-PASS DISPERSIVE SPECTROMETERS

BACKGROUND

Typically, an imaging spectrometer is composed of an objective or imaging optical module (also called foreoptics), which forms a scene image at an entrance slit of the spectrometer, and a spectral optical module, which receives and collimates the line field of view from the objective, disperses or separates the electromagnetic radiation as a function of wavelength, and images it onto a two-dimensional detector array. Both optical modules can have a variety of different optical forms, and can be reflective, refractive, or a combination of both. Reflective systems are generally recognized to provide advantages in terms of being somewhat easier to construct in large sizes (to provide large apertures), being generally lighter in weight that equivalent refractive systems, and being generally free of chromatic aberrations over a wide spectral bandwidth.

For imaging systems that image electromagnetic radiation from a distant object, the minimum number of optical elements is generally recognized to be three, to provide the minimum number of parameters that are necessary to correct for and/or prevent spherical aberration, coma, astigmatism and field curvature. An optical imaging system composed of three optical elements is often known as a triplet.

Reflective optical triplets are generally constructed such that entering electromagnetic radiation is received on a primary mirror, is reflected from the primary mirror onto a secondary mirror, is reflected from the secondary mirror onto a tertiary mirror, and finally, is focused onto an image plane where an image of the viewed object or scene is formed. Historically, a positive/negative/positive reflective optical triplet can be traced back to the work of Maurice Paul, in 1935 and James G. Baker, in 1945.

Many reflective optical triplets are configured such that all the optical elements lie on the optical axis of the optical system. For example, U.S. Pat. No. 3,460,886 to Rumsey (the "Rumsey '886 patent") discloses a reflective triplet that is arranged to be "on-axis" in terms of both aperture (i.e., the aperture stop is located on the optical axis) and field of view. This arrangement results in the occlusion of a significant portion of the electromagnetic radiation entering the system from a distant object, a restriction of the field of view of the system, and a constraint on the power distribution between optical elements. In the optical system described in the Rumsey '886 patent, the aperture stop is located on the optical axis and physically on the secondary mirror. In addition, the system has a virtual entrance pupil, is near telecentric, and has rotational symmetry.

Due to the drawbacks associated with a system such as that described in the Rumsey '886 patent, other reflective optical triplets are configured such that the field of view is not along the optical axis of the optical system but entirely to one side of it. For example, U.S. Pat. No. 4,240,707 to Wetherell et al. (the "Wetherell '707 patent") discloses a reflective optical triplet that is on-axis in aperture, but off-axis in field of view. The reflective optical triplet described in the Wetherell '707 patent has an aperture stop that is on the optical axis and is physically located on the secondary mirror. The entrance pupil to the optical system described in the Wetherell '707 patent is located a large distance behind the optical system, and as such, is virtual. In addition, the system has annular symmetry and is near telecentric.

Other reflective triplets are arranged to be off-axis in both aperture and field of view. For example, U.S. Pat. No. 4,733,955 to Cook (the "Cook '955 patent") describes a reflective triplet having a real entrance pupil that is located off-axis. The reflective optical triplet in the Cook '955 patent, as a natural result of the real entrance pupil, has a defining front aperture stop coincident with the real entrance pupil. The reflective triplet described in the Cook '955 patent has bilateral symmetry, and a virtual exit pupil. U.S. Pat. No. 8,248,693 to Cook (the "Cook '693 patent") discloses another example of a reflective triplet that is off-axis in both aperture and field of view. The reflective optical triplet in the Cook '693 patent has bilateral symmetry, a virtual entrance pupil, a real exit pupil, and a rear aperture stop located between the tertiary mirror and the image plane.

In certain spectrometers, a reflective triplet can be used as the spectral optical module. For example, U.S. Pat. No. 5,260,767 to Cook (the "Cook '767 patent") discloses an all-reflective imaging spectrometer having a three-mirror anastigmat acting as its objective and a reflective triplet with a dispersive element providing the spectral optical module. Similarly, U.S. Pat. No. 7,382,498 to Cook (the "Cook '498 patent") discloses the use of the non-relayed reflective triplet optical form for the spectral optical module of a spectrometer system. However, in other spectrometers the spectral optical module has a different optical form. For instance, U.S. Pat. No. 9,354,116 to Cook (the "Cook '116 patent") discloses various examples of the spectral optical module based on four-mirror and five-mirror anastigmat optical forms. Although relatively uncommon, a reflective triplet can also be used as the objective or foreoptics for certain types of spectrometers. For example, U.S. Pat. No. 6,100,974 discloses coupling a reflective triplet of the type disclosed in the Wetherell '707 patent to an Offner-Chrisp-type spectrometer.

SUMMARY OF INVENTION

Aspects and embodiments are directed to a reflective triplet optical form that can be used as an objective for multi-channel double-pass dispersive spectrometers, such as those disclosed in the Cook '116 patent, for example.

According to one embodiment an all-reflective, non-relayed optical system comprises a primary mirror configured to receive and reflect electromagnetic radiation from a viewed scene, the primary mirror defining an optical axis of the optical system, a secondary mirror configured to receive the electromagnetic radiation reflected from the primary mirror and to further reflect the electromagnetic radiation, and a tertiary mirror configured to receive the electromagnetic radiation reflected from the secondary mirror and to focus the electromagnetic radiation onto an image plane to form an image of the viewed scene, the primary mirror, the secondary mirror, and the tertiary mirror together being configured to form a virtual exit pupil for the optical system, the image plane being located between the tertiary mirror and the virtual exit pupil. The optical system has an aperture stop that is on-axis with respect to the optical axis, and wherein a line field of view of the optical system is off-axis with respect to the optical axis.

In one example, the primary mirror is disposed between the secondary mirror and the tertiary mirror. In one example, a distance between the primary mirror and the tertiary mirror is in a range of 50%-65% of a diameter of the primary mirror.

In one example, the primary mirror is a positive-powered mirror, the secondary mirror is a negative-powered mirror, and the tertiary mirror is a positive-powered mirror. In one example each of the primary mirror, the secondary mirror, and the tertiary mirror is a conic mirror. In another example each of the primary mirror, the secondary mirror, and the tertiary mirror is a higher-order aspheric mirror.

The all-reflective, non-relayed optical system may further comprise an unpowered fold mirror disposed between the secondary mirror and the tertiary mirror and configured to reflect the electromagnetic radiation reflected from the secondary mirror onto the tertiary mirror.

In one example, the secondary mirror is tilted and decentered relative to the optical axis. In another example, the tertiary mirror is tilted and decentered relative to the optical axis.

According to another embodiment a double-pass imaging spectrometer comprises an objective configured to receive electromagnetic radiation from a viewed scene and to focus the electromagnetic radiation onto an image plane to produce an image of the viewed scene, the objective including a reflective triplet having a virtual exit pupil and configured to be on-axis in aperture and off-axis in field of view relative to an optical axis of the reflective triplet, a spectral optical module having a relayed optical form and a reimaged entrance pupil aligned and coincident with the virtual exit pupil of the objective, the reflective triplet of the objective and the spectral optical module being pupil-matched to one another, and an entrance slit aligned and coincident with the image plane of the objective, the spectral optical module being configured to receive the electromagnetic radiation from the objective via the entrance slit and to double-pass the electromagnetic radiation.

In one example, the spectral optical module is one of an all-reflective four-mirror anastigmat and an all-reflective five-mirror anastigmat.

The double-pass imaging spectrometer may further comprise at least one imaging sensor disposed at the image plane.

In one example the reflective triplet includes a primary mirror configured to receive and reflect the electromagnetic radiation from a viewed scene, the primary mirror defining the optical axis, a secondary mirror configured to receive the electromagnetic radiation reflected from the primary mirror and to further reflect the electromagnetic radiation, and a tertiary mirror configured to receive the electromagnetic radiation reflected from the secondary mirror and to focus the electromagnetic radiation onto the image plane to form the image of the viewed scene, the image plane being located between the tertiary mirror and the virtual exit pupil. The primary mirror may be disposed between the secondary mirror and the tertiary mirror. In one example, a distance between the primary mirror and the tertiary mirror is in a range of 50%-65% of a diameter of the primary mirror. In one example, the primary mirror is a positive-powered mirror, the secondary mirror is a negative-powered mirror, and the tertiary mirror is a positive-powered mirror. In another example each of the primary mirror, the secondary mirror, and the tertiary mirror is a conic or higher-order aspheric mirror. The objective may further include an unpowered fold mirror disposed between the secondary mirror and the tertiary mirror and configured to reflect the electromagnetic radiation reflected from the secondary mirror onto the tertiary mirror. In one example, the secondary mirror and the tertiary mirror are tilted and decentered relative to the optical axis. In one example, an entrance pupil of the reflective triplet is centered on optical axis and located on the primary mirror.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a table showing an example of an optical prescription for one embodiment of the reflective triplet of FIGS. 1A and 1B according to aspects of the present invention.

DETAILED DESCRIPTION

As discussed above, an imaging spectrometer is generally comprised of two separate optical components, namely, the objective or foreoptics and the spectral optical module. A reflective triplet can be used to provide the spectral optical module of some spectrometers. However, as discussed in the Cook '116 patent, because the reflective triplet optical form is non-reimaging (non-relayed), when used for infrared applications, the entire spectrometer optical train must be cooled, generally inside a cryo-vac housing. This requirement results in a cool-down time measuring several hours, which may severely limit the use of the instrument in certain applications or environments. In contrast, aspects and embodiments disclosed herein are directed to the use of a modified reflective triplet optical form for the objective, rather than the spectral optical module. This objective can be used together with a spectral optical module having a reimaging or relayed all-reflective optical form in double-pass dispersive spectrometers, such as those disclosed in the Cook '116 patent, for example. For infrared applications, the relayed nature of the spectral optical module allows for removal of the optics from the cooling chamber (e.g., cryo-vac housing), resulting in an ability to use a much smaller chamber that houses only the slit(s) and imaging detectors/sensors, such as a tactical-style Dewar, for example, and greatly reduced cool-down times. For example, cool-down times on the order of a few minutes may be achieved.

As discussed further below, embodiments of the reflective triplet disclosed herein have an optical form that is on-axis in aperture and off-axis in field of view. This allows the line field of view to be accessible for use by a subsequent optical system, such as the spectral optical module of a spectrometer, for example. Further, certain embodiments of the reflective triplet are configured to provide a virtual exit pupil that is ideally sized and located to allow optical coupling to the spectral optical modules of the ambient-optics longwave infrared (LWIR) spectrometers disclosed in the Cook '116 patent.

Figure 1A:
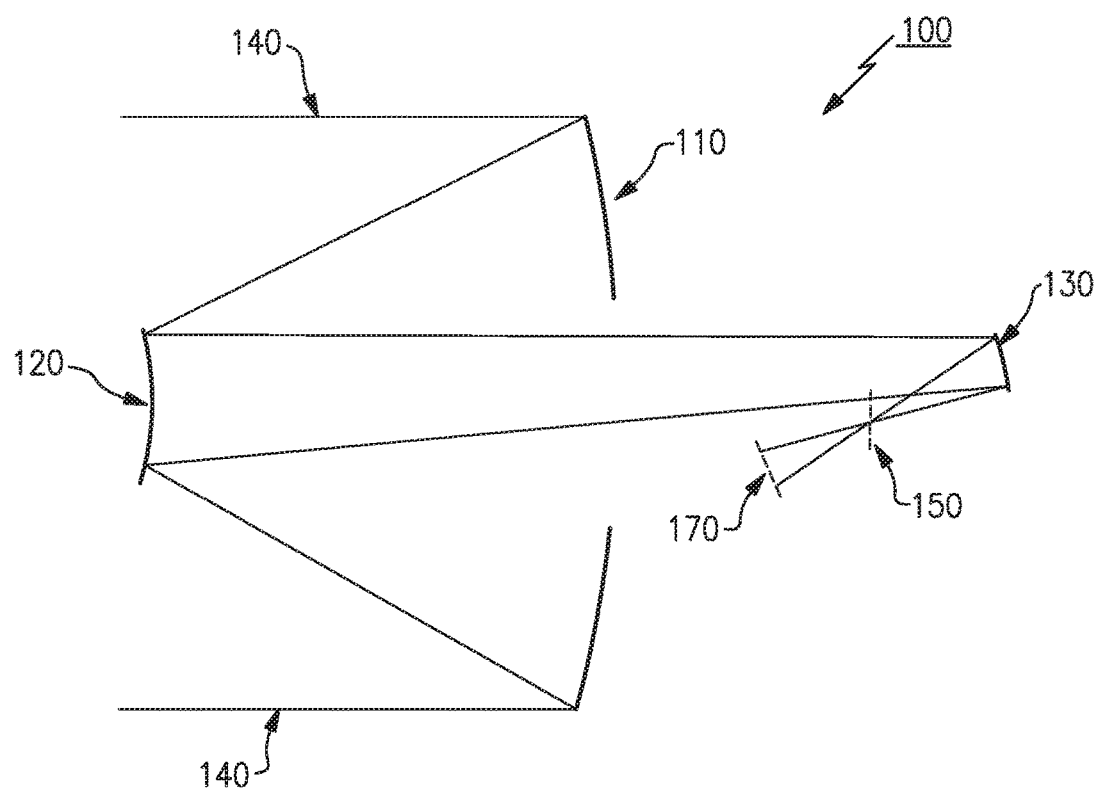
FIG. 1A is a side elevational view of a partial ray trace of one example of a reflective triplet according to aspects of the present invention.
Figure 1B:
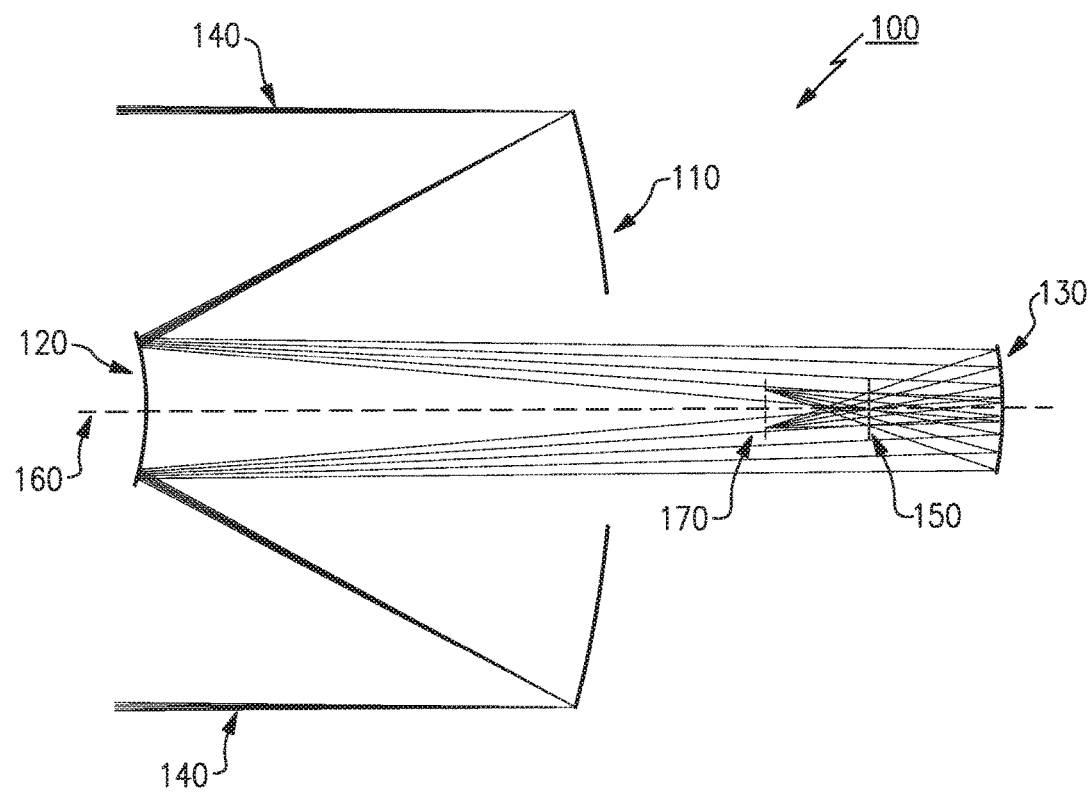
FIG. 1B is a plan view of a partial ray trace of the example of the reflective triplet of FIG. 1A, according to aspects of the present invention.

Referring to FIGS. 1A and 1B there is illustrated an example of an all-reflective, non-relayed reflective triplet 100 according to certain embodiments. The reflective triplet 100 includes a primary mirror 110, a secondary mirror 120, and a tertiary mirror 130. Incident electromagnetic radiation 140 is received at the primary mirror 110, reflected by the primary mirror 110 onto the secondary mirror 120, and reflected by the secondary mirror 120 onto the tertiary mirror 130. The tertiary mirror 130 reflects and focuses the electromagnetic radiation 140 onto an image plane 150. The primary mirror 110 has a central axis which defines the optical axis 160 of the reflective triplet 100. The entrance pupil of the reflective triplet 100 is located on the primary mirror 110 and centered on the optical axis 160. In the illustrated example, the primary mirror 110 is a positive-powered mirror and may be a conic or higher-order aspheric mirror. The secondary mirror 120 in this example is a negative-powered mirror, and may also be a conic or higher-order aspheric mirror. The tertiary mirror 130 is a positive-powered mirror, and may also be a conic or higher-order aspheric mirror. The reflective triplet 100 forms a virtual exit pupil 170 located behind the tertiary mirror 130 (i.e., external) as shown. The reflective triplet 100 is non-relayed in that it does not form an intermediate image prior to the final image plane 150.

The form and arrangement of the primary mirror 110 and the secondary mirror 120 are somewhat comparable to those in the classical on-axis aperture reflective triplet disclosed in the Rumsey '886 patent. However, the reflective triplet of the Rumsey '886 patent has numerous characteristics and drawbacks that render it unsuitable as foreoptics for spectrometers such as those disclosed in the Cook '116 patent. For example, in the classical configuration, the secondary and tertiary mirrors and the final image plane are located within the incoming aperture (the system is on-axis in both aperture and field of view, as discussed above), and are inaccessible for the placement of a subsequent instrument, such as the spectral optical module of a spectrometer. In contrast, the reflective triplet 100, while being on-axis in aperture, is off-axis in field of view. In particular, as may be seen with reference to FIGS. 1A and 1B, in the reflective triplet 100 the tertiary mirror 130 is located well behind the primary mirror 110, rather than coincident with the primary mirror as is the case in the Rumsey '886 patent. In certain examples, the tertiary mirror is located a distance back from the primary mirror that corresponds to at least half the diameter of the primary mirror. In certain examples, the distance between the primary mirror and the tertiary mirror is as much as 65% of the diameter of the primary mirror. The virtual exit pupil 170 and the final image plane 150 are also located well back of the primary mirror 110. In addition, the line field of view of the reflective triplet 100 is located well off the optical axis 160, and thus is accessible for use by the subsequent instrument.

Figure 2:
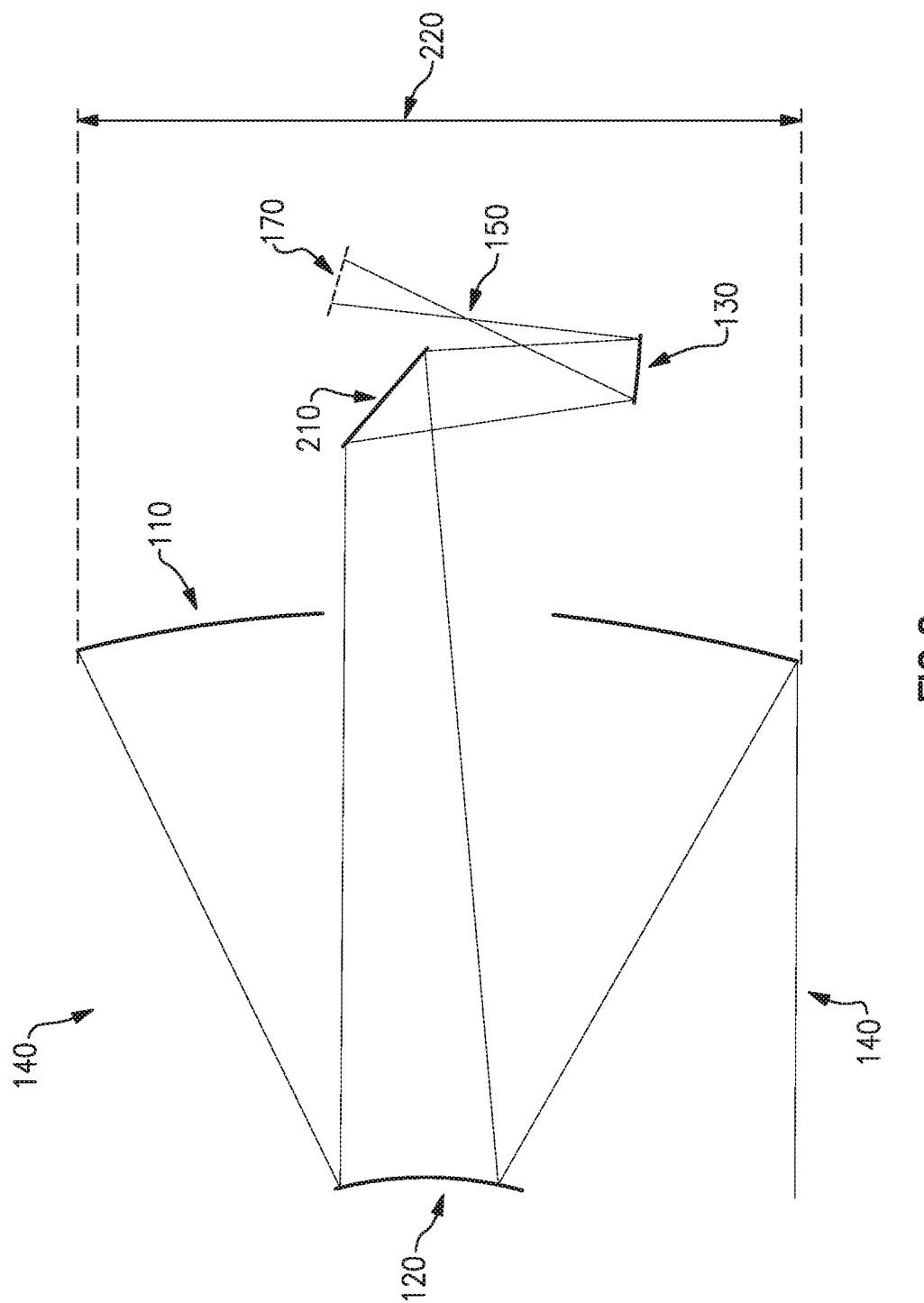
FIG. 2 is a partial ray trace of an example of the reflective triplet of FIGS. 1A and 1B having a folded configuration according to aspects of the present invention.

Because the tertiary mirror 130 is located distant from the primary mirror 110, in certain examples the reflective triplet 100 may have a relatively large physical length. However, in certain applications, it may be desirable to reduce or minimize the physical size, including the length, of the reflective triplet 100. Accordingly, in certain examples, one or more fold mirrors can be used to redirect the electromagnetic radiation 140 and reduce the physical length of the reflective triplet 100. Referring to FIG. 2, there is illustrated an example of the reflective triplet 100 having a folded arrangement. In this example, a flat (unpowered) fold mirror 210 is placed optically between the secondary mirror 120 and the tertiary mirror 130. With this arrangement, the physical length of the reflective triplet 100 is reduced compared to the unfolded configuration shown in FIGS. 1A and 1B. In addition, all the optical components and features of the reflective triplet (including the primary mirror 110, the secondary mirror 120, the tertiary mirror 130, the final image plane 150 and the virtual exit pupil 170), and the fold mirror 210, can be contained within a spatial cylinder defined by the primary mirror 110, as indicated by 220. This arrangement may provide packaging advantages in certain applications, such as some airborne imaging applications, for example.

The table shown in FIG. 3 provides an example of an optical prescription for one embodiment of the reflective triplet 100 in accord with the aspects and principles disclosed herein. The optical prescription for this example may be generated using an equation which is an industry standard and which would be known to those skilled in the art. It is to be appreciated however, that the prescription given in FIG. 3 is merely exemplary, and that the prescriptions of various embodiments of the reflective triplet 100 are determined by the intended task to be performed by the optical system and desired system characteristics. In the table of FIG. 3, the column designated "Element" identifies the optical element corresponding to the surface, with the reference numerals corresponding to FIGS. 1A, 1B and 2 given in parentheses. The column designated "Rd" provides the radius of the respective surface, measured in inches. The minus sign indicates that the center of curvature is to the left of the mirror surface. The column designated CC is the conic constant which is equal to the negative squared value of the eccentricity of a conic section (a planar cut through a double sheeted conic surface). The columns designated Ad, Ae, Af and Ag are the aspheric constants of the specific mirror surfaces. The columns designated "Decenter" and "Tilt" describe the decenters and tilts, respectively, of the surfaces relative to the optical axis 160. The column designated "Thickness" provides the distance between distance between the respective surface and the next surface (identified in the adjacent lower row of the table), measured in inches. The column designated "Material" provides the material of the respective surface.

Embodiments of the reflective triplet 100, including examples having the optical prescription given in FIG. 3, can provide an ideal objective/foreoptics for embodiments of the double-pass spectrometer disclosed in the Cook '116 patent, for example. In particular, embodiments of the reflective triplet 100 can provide a solution to the unique requirements of the spectral optical module of examples of the spectrometer disclosed in the Cook '116 patent, such as design goals of a large aperture and modest field of view. For example, the reflective triplet 100 has an external virtual exit pupil 170 that can be pupil matched with the entrance pupil of a four-mirror anastigmat (4MA) or five-mirror anastigmat (5MA), such as those used in examples of the spectral optical module of the spectrometer disclosed in the Cook '116 patent.

Figure 4:
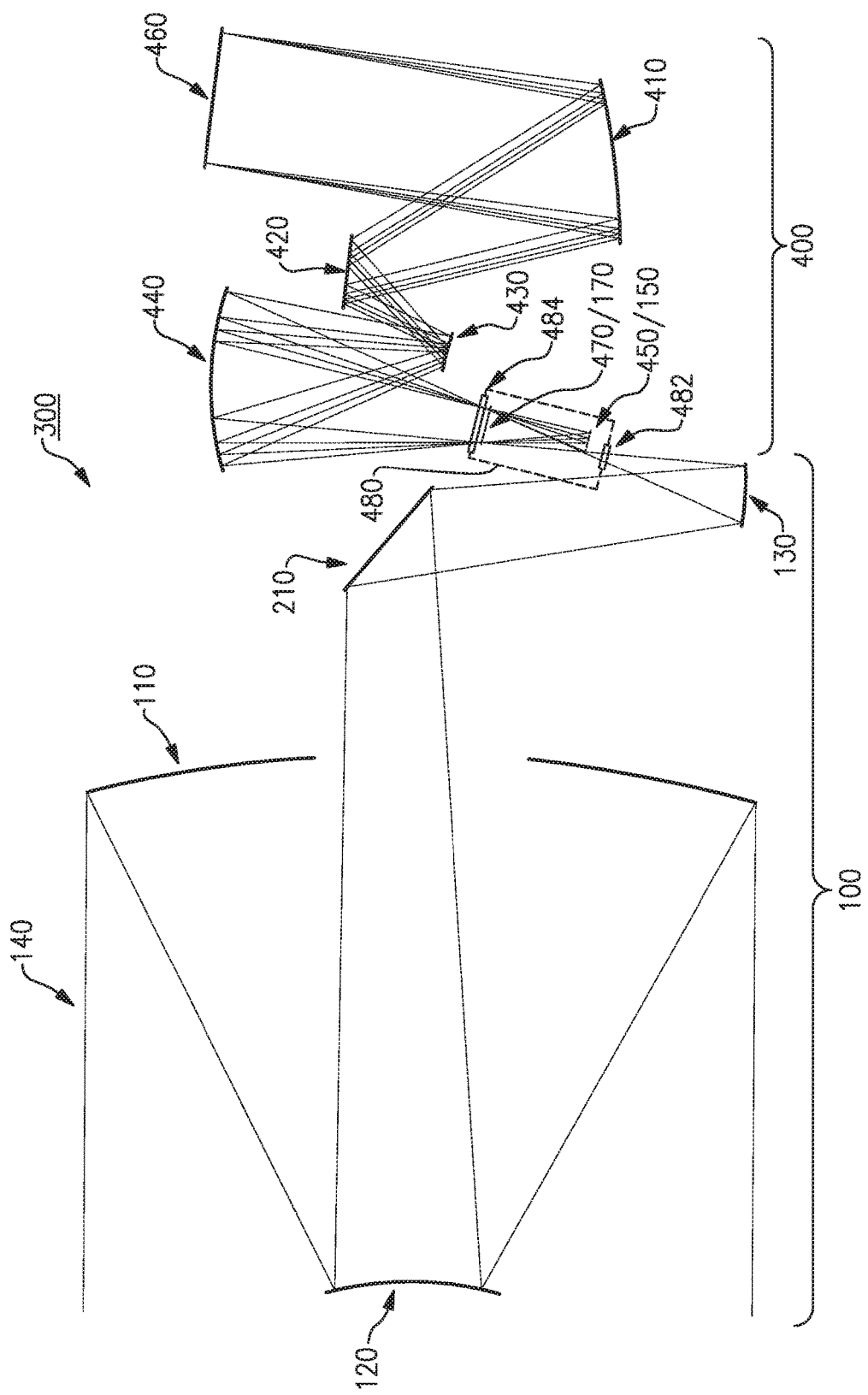
FIG. 4 is a partial ray trace of one example of an imaging spectrometer including an example of the folded-configuration reflective triplet of FIG. 2 used as the objective for the spectrometer, according to aspects of the present invention

Referring to FIG. 4 there is illustrated an example of a spectrometer 300 that includes the reflective triplet 100 as an objective coupled with a spectral optical module 400. In the illustrated example, the spectral optical module 400 is an all-reflective four-mirror anastigmat, having a primary mirror 410, a secondary mirror 420, a tertiary mirror 430, and a quaternary mirror 440. However, as discussed above, examples of the reflective triplet 100 can also be pupil matched and coupled with a spectral optical module configured as an all-reflective five-mirror anastigmat. Electromagnetic radiation 140 from the viewed scene is input to the spectral optical module 400 from the objective, in this case the reflective triplet 100, via a slit 450 that is aligned and coincident with the image plane 150 produced by the reflective triplet 100. An imaging sensor (not shown) can be co-located at the common image plane 150 with the slit 450. In certain examples in which the spectrometer 300 is a dual-band spectrometer, the electromagnetic radiation 140 can be split into first and second spectral bands, and corresponding first and second imaging sensors or detectors (one for each spectral channel) can be co-located with the slit 450 at the image plane 150.

In the example illustrated in FIG. 4, the four-mirror anastigmat is arranged in a double-pass configuration, forming a reimaged pupil 470 that coincides with the virtual exit pupil 170 of the reflective triplet 100. The spectral optical module 400 further includes a real entrance pupil 460 at which one or more (e.g., a pair for a dual-band example) reflective dispersive elements (e.g., diffraction gratings), one for each spectral channel, can be placed and which spectrally disperse the electromagnetic radiation 140 and reflect the dispersed radiation back through the four-mirror anastigmat to the imaging sensor(s) located at the image plane 150.

As discussed above, an advantage of the spectral optical module 400 having a relayed or re-imaged form, such as the example shown in FIG. 4, is that it is not necessary to cool the optics for infrared applications; instead, a relatively small cooling chamber (e.g., a cryo-vac housing) that houses only the slit(s) 450 and imaging detectors/sensors can be used. Accordingly, in certain applications, a cooling chamber 480 can be provided that extends from just beyond the image plane 150 to just beyond the reimaged pupil 470 so as to encompass the slit 450 and the imaging sensor(s) at the image plane 150. This chamber 480 may have optically transparent windows 482, 484 that are proximate (as shown in FIG. 4) or roughly coincident with the image plane 150 and the pupil 470/170, respectively.

The combination of the reflective triplet 100 and the spectral optical module 400 can be well pupil-matched (i.e., the reflective triplet is designed to have the virtual exit pupil 170 well matched to the re-imaged entrance pupil 470 of the optics of the spectral optical module 400), and configured to optically match image to image (i.e., the image plane 150 is common to both reflective triplet 100 and the optics of the spectral optical module 400). In addition, the spectral optical module and the reflective triplet can be configured to have the same F-numbers (optical speeds). These features can be accomplished in the optical design of the reflective triplet 100 by placing the tertiary mirror 130 well back of the primary mirror 110 (in the unfolded configuration), as discussed above and shown in FIGS. 1A and 1B, and implementing the optical form off-axis in field of view based on the location of the tertiary mirror 130 and the desired locations of the image plane 150 and the virtual exit pupil 170. The example of the reflective triplet corresponding to the optical prescription given in the table of FIG. 3 meets these conditions for the four-mirror anastigmat example of the spectral optical module disclosed in the Cook '116 patent. Variations and further examples can be implemented to couple with other relayed spectral optical modules, as will be apparent to those skilled in the art given the benefit of this disclosure.

Thus, aspects and embodiments provide a modified reflective triplet 100 that can be advantageously used as the objective for a double-pass imaging spectrometer having a relayed spectral optical module 400. As discussed above, the line field of view of the reflective triplet is located well off the optical axis such that it is accessible for use by the spectral optical module of the spectrometer, or another subsequent optical instrument. Unlike many other reflective triplet optical forms, in embodiments of the reflective triplet 100 disclosed herein, the tertiary mirror 130 is located (in the unfolded configuration) well behind the primary mirror 110. For example, in the unfolded configuration, the tertiary mirror may be located a distance behind the primary mirror that is in a range of approximately 50%-65% of the diameter of the primary mirror. The virtual exit pupil 170 and the image plane 150 can similarly be located well behind the primary mirror 110 in the unfolded configuration. In addition, as discussed above, one or more fold mirrors can be incorporated with the reflective triplet optics to achieve a compact package. Through the use of well-designed surface shapes for the primary mirror 110, secondary mirror 120, and tertiary mirror 130, for example having aspheric departures as disclosed in the table of FIG. 3, the reflective triplet 100 can be configured to provide correction of all aberrations (most importantly field curvature), while also locating the virtual exit pupil 170 in a position suited to the subsequent spectral optical module 400 of the double-pass spectrometer 300. These design features provide for the practical use of spectrometers such as those disclosed in the Cook '116 patent in real-world spectral sensing systems, including hyper-spectral imaging applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments systems discussed herein are not limited in application to the details of construction and the arrangement of components set forth in the foregoing description or illustrated in the accompanying drawings. The optical systems and components are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. An all-reflective, non-relayed optical system comprising:
   a primary mirror configured to receive and reflect electromagnetic radiation from a viewed scene, the primary mirror defining an optical axis of the optical system;
   a secondary mirror configured to receive the electromagnetic radiation reflected from the primary mirror and to further reflect the electromagnetic radiation; and
   a tertiary mirror configured to receive the electromagnetic radiation reflected from the secondary mirror and to focus the electromagnetic radiation onto an image plane to form an image of the viewed scene, the primary mirror, the secondary mirror, and the tertiary mirror together being configured to form a virtual exit pupil for the optical system, the image plane being located between the tertiary mirror and the virtual exit pupil;
   wherein the optical system has an aperture stop that is on-axis with respect to the optical axis, and wherein a line field of view of the optical system is off-axis with respect to the optical axis.

2. The all-reflective, non-relayed optical system of claim 1 wherein the primary mirror is disposed between the secondary mirror and the tertiary mirror.

3. The all-reflective, non-relayed optical system of claim 2 wherein a distance between the primary mirror and the tertiary mirror is in a range of 50%-65% of a diameter of the primary mirror.

4. The all-reflective, non-relayed optical system of claim 1 wherein the primary mirror is a positive-powered mirror, the secondary mirror is a negative-powered mirror, and the tertiary mirror is a positive-powered mirror.

5. The all-reflective, non-relayed optical system of claim 4 wherein each of the primary mirror, the secondary mirror, and the tertiary mirror is a conic mirror.

6. The all-reflective, non-relayed optical system of claim 4 wherein each of the primary mirror, the secondary mirror, and the tertiary mirror is a higher-order aspheric mirror.

7. The all-reflective, non-relayed optical system of claim 1 further comprising an unpowered fold mirror disposed between the secondary mirror and the tertiary mirror and configured to reflect the electromagnetic radiation reflected from the secondary mirror onto the tertiary mirror.

8. The all-reflective, non-relayed optical system of claim 1 wherein the secondary mirror is tilted and decentered relative to the optical axis.

9. The all-reflective, non-relayed optical system of claim 8 wherein the tertiary mirror is tilted and decentered relative to the optical axis.

10. A double-pass imaging spectrometer comprising:
    an objective configured to receive electromagnetic radiation from a viewed scene and to focus the electromagnetic radiation onto an image plane to produce an image of the viewed scene, the objective including a reflective triplet having a virtual exit pupil and configured to be on-axis in aperture and off-axis in field of view relative to an optical axis of the reflective triplet;
    a spectral optical module having a relayed optical form and a reimaged entrance pupil aligned and coincident with the virtual exit pupil of the objective, the reflective triplet of the objective and the spectral optical module being pupil-matched to one another; and
    an entrance slit aligned and coincident with the image plane of the objective, the spectral optical module being configured to receive the electromagnetic radiation from the objective via the entrance slit and to double-pass the electromagnetic radiation.

11. The double-pass imaging spectrometer of claim 10 wherein the spectral optical module is one of an all-reflective four-mirror anastigmat and an all-reflective five-mirror anastigmat.

12. The double-pass imaging spectrometer of claim 10 further comprising at least one imaging sensor disposed at the image plane.

13. The double-pass imaging spectrometer of claim 10 wherein the reflective triplet includes:
    a primary mirror configured to receive and reflect the electromagnetic radiation from a viewed scene, the primary mirror defining the optical axis;
    a secondary mirror configured to receive the electromagnetic radiation reflected from the primary mirror and to further reflect the electromagnetic radiation; and
    a tertiary mirror configured to receive the electromagnetic radiation reflected from the secondary mirror and to focus the electromagnetic radiation onto the image plane to form the image of the viewed scene, the image plane being located between the tertiary mirror and the virtual exit pupil.

14. The double-pass imaging spectrometer of claim 13 wherein the primary mirror is disposed between the secondary mirror and the tertiary mirror.

15. The double-pass imaging spectrometer of claim 14 wherein a distance between the primary mirror and the tertiary mirror is in a range of 50%-65% of a diameter of the primary mirror.

16. The double-pass imaging spectrometer of claim 13 wherein the primary mirror is a positive-powered mirror, the secondary mirror is a negative-powered mirror, and the tertiary mirror is a positive-powered mirror.

17. The double-pass imaging spectrometer of claim 13 wherein each of the primary mirror, the secondary mirror, and the tertiary mirror is a conic or higher-order aspheric mirror.

18. The double-pass imaging spectrometer of claim 13 wherein the objective further includes an unpowered fold mirror disposed between the secondary mirror and the tertiary mirror and configured to reflect the electromagnetic radiation reflected from the secondary mirror onto the tertiary mirror.

19. The double-pass imaging spectrometer of claim 13 wherein the secondary mirror and the tertiary mirror are tilted and decentered relative to the optical axis.

20. The double-pass imaging spectrometer of claim 13 wherein an entrance pupil of the reflective triplet is centered on optical axis and located on the primary mirror.

* * * * *